ELECTRICAL GENERATING APPARATUS
Filed Dec. 6, 1947
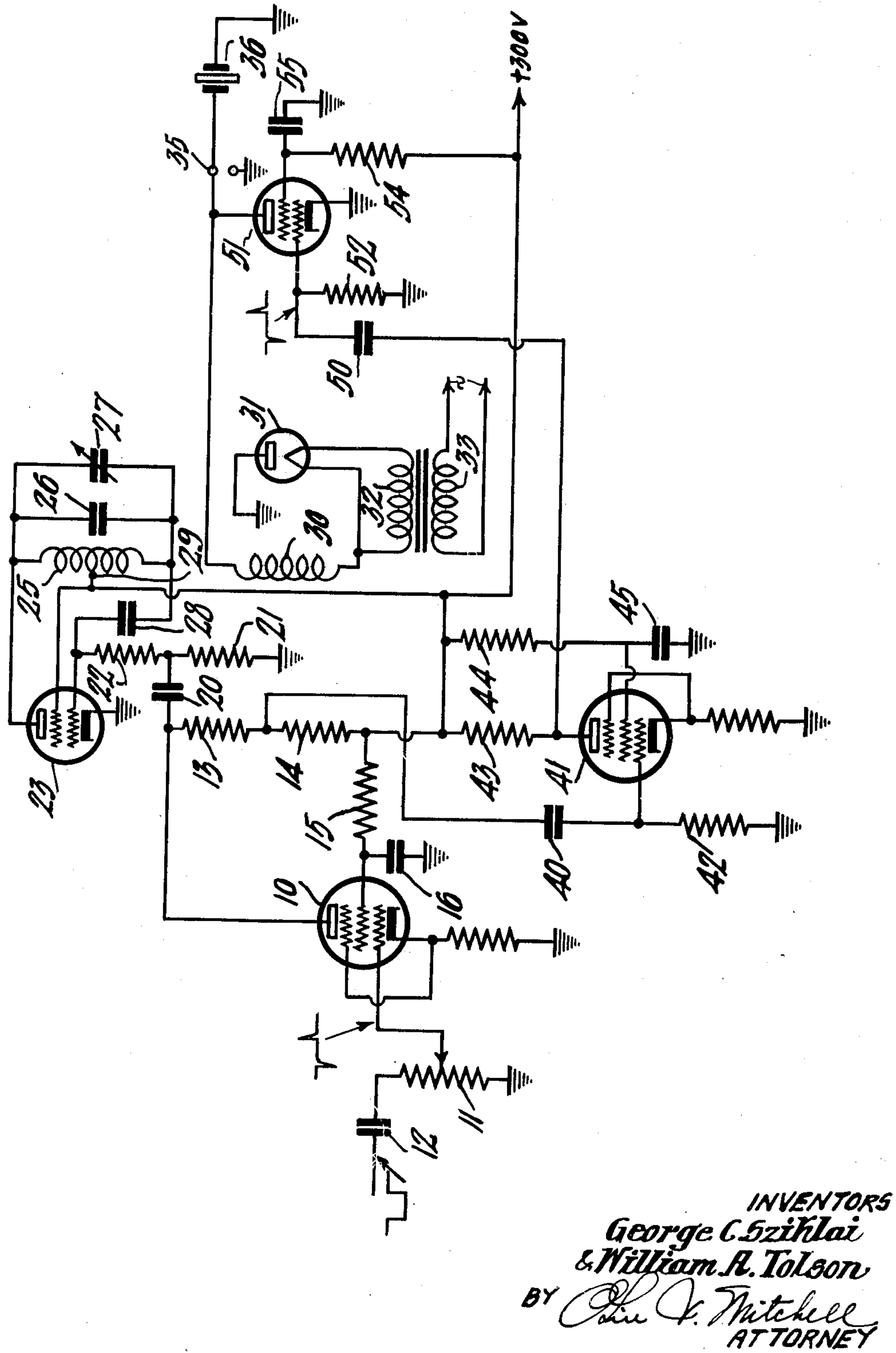
INVENTORS
George C. Sziklai
& William A. Tolson
BY [signature]
ATTORNEY Patented Nov. 27, 1951

2,576,652

UNITED STATES PATENT OFFICE 2,576,652

ELECTRICAL GENERATING APPARATUS

George C. Sziklai and William A. Tolson, Princeton, N. J., assignors to Radio Corporation of America, a corporation of Delaware Application December 6, 1947, Serial No. 790,080

9 Claims. (Cl. 250—27)

Our invention relates, in general, to electrical pulse producing circuits and more particularly to such circuits as used for impressing potentials at intermittent intervals onto electrical elements such for instance as crystals, condensers, or the like.

In the television art, there are numerous instances when it is desired to charge an electrical element such as a crystal or a condenser rapidly to a fixed potential and to hold the element at that potential for a predetermined length of time. In one example of the color television art for instance, there are employed several electro-optical crystals for the control of the color field being reproduced at any particular instant. Since this invention is not devoted particularly to this particular type of color television system, it suffices to say that in general, the color field which is allowed to pass through a color filter element, is controlled by the charge on an electro-optical crystal which controls the polarization of light passing therethrough and which cooperates with appropriately polarized color filters to allow a selection of filters in accordance with the potential impressed on the crystal. Where a plurality of component color fields are reproduced at something over one hundred times per second, charging of the crystal which controls the passage of the modulated light governing the reproducing of any particular color field must be quick, fixed in time and must be accurate. Such electro-optical crystals are used in arts other than the color television art and in general, these crystals may be described as elements which control the polarization of light passing therethrough in accordance with potentials impressed thereon.

Additionally, a quickly produced, time controlled, high voltage rectangular wave, finds many uses in other phases of the television and communication's art. An example of such use is in the transmission of synchronizing signals for television reception wherein the synchronizing pulse may be impressed onto the transmitted carrier wave by means of high voltage plate modulation in the modulating section of a television transmitter.

Also, in the communications art the method of transmitting intelligence by pulse width modulation and pulse position modulation or pulse code modulation all can be accomplished by suitable high voltage plate modulation in the modulating section of a communications transmitter. The signals accomplishing this modulation must be sharp and must be accurately controlled and timed. This can be done most easily perhaps by charging an elecrtical element such for instance as a condenser, to a high voltage and discharging it quickly and in timed relationship to the charging time. It is a further object of our invention therefore to provide circuits by means of which such high voltage, accurately shaped, and accurately timed pulses may be produced under the control of relatively low voltage wave forms. The pulses so produced are provided by rapidly charging an electrical element such for instance as a condenser to a high potential very quickly and discharging the condenser in timed relationship to the charging thereof.

Previously, this has been attempted by the use of mechanical switching. In addition to the fact that mechanical switching has been proven to be too slow, the actual operation of the switch suffered from severe disadvantages where voltages of high value were used. Since with the electro-optical crystals, voltages of 10,000 volts or more have been used, it will be seen that mechanical switching provides a very poor answer to the problem.

Another idea used previously, was to charge the crystal by the means of a vacuum tube for a relatively long period of time and to allow the charge to dissipate itself through resistance elements connected in parallel with the crystal. One of the difficulties inherent in this solution of the problem has been that where the resistance was sufficiently large so that the crystal could be charged to a relatively high voltage value, the time contsant of the resistance and crystal combination was so great as to be prohibitive of use, and where the resistance was small in value the amount of charging current necessary to charge the crystal to a high voltage value was prohibitively large. Additionally, the disadvantage was present that the charging tube is across the crystal at all times and, in one arrangement had to supply about 5 milliamperes for about one-third of the operating cycle of the complete device and had to handle about 10,000 volts potential.

It is another of the objects of our invention therefore to provide a charging circuit which will charge an electrical element quickly and to a high potential if desired, and which will maintain the charge for a definite period of time and which will discharge the element quickly.

It is a still further object of the invention to provide a circuit of the nature hereinbefore indicated, in which the discharge of the element is timed to take place definitely at a predetermined time with respect to the charging of the element.

It is a still further object of the invention to provide a source of high D. C. voltage in the form of intermittent pulses which may be easily controlled by reatively easily generated low voltage waves.

Our invention in general, in a preferred embodiment, contemplates the provision of a source of low voltage rectangularly shaped pulses which may be supplied for instance by a multivibrator or other well known pulse generating means. The rectangular wave is differentiated so that there are produced two voltage "pips" or pulses of short duration and of opposing polarity.

The leading pulse or "pip" is utilized to key on an oscillator which is normally maintained in a quiescent state. The output of the oscillator may be transformer coupled to a high voltage rectifier, the output of which is connected directly across the electro-optical crystal or other electrical element sought to be charged.

A discharge path is provided in parallel with the crystal and comprises a thermionic tube having a control grid which normally is biased to cut-off. The trailing edge of the differentiated wave is effectively impressed onto a grid of the normally conducting tube in such a polarity that the tube is blocked by the wave. When this occurs the bias is removed from the grid of the thermionic tube forming the discharge path for the electro-optical crystal or other element and the tube then will conduct and discharge the charge which is accumulated on the element. Thus there has been supplied to the element a rapid high voltage charge which is held for a period of time which is governed by the control wave which has been differentiated and which is rapidly discharged at the end of the control wave.

Our invention will best be understood with reference to the drawings in which the single figure shows the embodiment thereof.

Referring to the drawing:

There is provided a vacuum tube 10, which in this illustration is a pentode type of tube. A control grid of the tube is connected to the slide arm of a potentiometer having a resistor 11 and one terminal of the resistor is grounded and the other terminal thereof is connected serially to a condenser 12. Resistor 11 and condenser 12 form a differentiating circuit onto which may be impressed a low voltage rectangularly shaped wave as illustrated schematically adjacent the lead connected to the condenser. This wave form after it is differentiated will have the general appearance of the wave form illustrated schematically adjacent the lead connecting the slide arm of the potentiometer to the control grid of the tube.

The anode of the tube is connected serially with two resistors 13 and 14 and thence to a source of positive biasing potential. Resistor 14 is connected serially with a resistor 15 and the screen grid of the tube, and the screen grid is A. C. grounded through condenser 16.

The anode of the tube also is connected to ground through serially connected condenser 20 and resistor 21. The common terminal of condenser 20 and resistor 21 is connected through resistor 22 to the control grid of a screen grid type of vacuum tube 23. The latter vacuum tube is a component of an oscillator having a tuned circuit including inductance 25 and shunt condensers 26 and 27. This tuned circuit is connected between the plate of the tube and the control grid thereof through a condenser 28. The screen grid of the tube is connected to a tapped point 29 on inductance 25. This arrangement forms a well known type of oscillator whose operation is well understood to those skilled in the art and accordingly its operation in detail will not be described in this specification. Positioned adjacent the inductance 25 is an inductive element 30 which is coupled to the inductance 25 and receives oscillatory energy therefrom.

There is provided a high voltage rectifier comprising a diode 31 whose plate is grounded and whose filament is heated by the secondary 32 of a transformer whose primary 33 is energized by an appropriate power source. The filament (or cathode) of the high voltage rectifier is connected through the inductance 30 to one terminal 35 of the output circuit of the device, the other terminal being the ground connection. An element to be charged such as a crystal 36 or other appropriate electrical element such as a condenser for instance, is connected between the terminal 35 and ground.

The common terminal between resistors 13 and 14 is connected through condenser 40 to the control grid of a pentode 41, the grid being grounded through resistor 42. The anode of the tube is connected to a source of positive potential through resistor 43 and the screen grid of the tube is connected to the same source of positive potential by resistor 44. The screen grid is A. C. grounded through condenser 45.

Voltages developed in the common terminal of resistor 43 and the plate of tube 41 are impressed through condenser 50 onto the control grid of an amplifying tube 51, the control grid being grounded through the high resistance 52. The screen grid of the tube is energized by connecting it to the source of positive potential through resistor 54, and the screen grid is A. C. grounded through condenser 55. The plate of the tube is connected to terminal 35 of the output circuit of the device. The operation of the apparatus is as follows:

The oscillator including the tube 23 is normally maintained in a non-oscillating condition or, as it may be termed, a quiescent state and it is maintained in this codition due to the bias supplied thereto by its connection to the anode of tube 10 which normally is conducting and under normal operating conditions this state may be maintained. When the leading edge of the differentiated low voltage rectangular wave is impressed onto the grid of tube 10, the pulse causes a decrease in the plate current of the tube thus affecting the bias on the oscillator and the oscillator will oscillate at a frequency dependent on its circuit parameters for the duration of the negative differentiated pulse impressed on the grid of tube 10.

The coil 30 which is coupled to the coil 25 of the oscillator will have a high voltage impressed thereon and this voltage is rectified by the half wave rectifier comprising the diode 31. This rectified voltage then will charge the element 36 connected between the terminal 35 and ground to a high voltage. The element 36 connected across the output terminal will retain the charge until some discharge path is provided therefor.

When the trailing edge of the differentiated low voltage wave is impressed onto the control electrode of the tube 10, the plate current of the tube will rise sharply in value. When this occurs a negative pulse will be impressed onto the control electrode of tube 41 and the plate current thereof will sharply decrease. The plate voltage of tube 41 then will rise sharply and this pulse will be communicated to the control grid of tube 51 and thus drive the tube 51 well beyond its cut-off state and tube will conduct. Since tube 51 is shunted directly across the output terminals to which the crystal or condenser is connected, the charge on the charged element will be rapidly discharged through the space discharge path of the tube. Additionally, tube 51 will draw grid current and this will charge the grid condenser 50 to a negative value which will hold the discharge tube 51 well below its cut-off potential and this state would be maintained (due to the time constants involved) for a period of time considerably longer than the time between the occurrence of the control pulses and therefore under normal dynamic operation conditions, the discharge path furnished by tube 51 will be blocked at all times except when pulsed into a conducting state by the action of the trailing edge of the differentiated control pulses on tube 10.

In one practical embodiment of the device as built and operated the following elements have had the following circuit parameters:

| Tubes: | | Type |
|---|---|---|
| 10 | | 6V6 |
| 23 | | 6L6 |
| 31 | | 8013 |
| 41 | | 6V6 |
| 51 | | 807 |
| **Resistors, Number:** | | |
| 11 | megohm | 1 |
| 13 | | 8,500 |
| 14 | | 280 |
| 15 | | 33,000 |
| 21 | | 20,000 |
| 22 | | 1,000 |
| 42 | megohm | 1 |
| 43 | | 8,500 |
| 44 | | 33,000 |
| 52 | megohm | 1 |
| **Capacitors, Number:** | | |
| 12 | | 150 |
| 16 | mfd | 20 |
| 20 | mfd | 16 |
| 28 | mfd | .001 |
| 26 | mfd | .004 |
| 40 | mfd | .25 |
| 45 | mfd | 20 |
| 50 | mfd | .25 |

Resistance values are in ohms and capacitor values in micromicrofarads unless otherwise indicated.

What is claimed is:

1. An electrical charging circuit comprising a source of control waves, an oscillator, means for keying said oscillator alternately into an active and quiescent state under the control of said control waves, a rectifier coupled to said oscillator for rectifying at least a portion of the output thereof, an output circuit connected to said oscillator and furnished with charging potentials and current by said rectifier, a normally blocked discharge path connected substantially in parallel with at least a portion of the output circuit of said rectifier and means for governing the conducting state of said discharge path under the control of the waveform edges of said control waves.

2. A charging circuit for charging an electrical element comprising an oscillator, a source of control signals, means for maintaining said oscillator in a selected state of operation, means for changing the operating state of said oscillator under the control of said control signals, rectifying means coupled to said oscillator for rectifying at least a portion of the output thereof, an output circuit for said rectifier adapted to supply charging voltages to an element to be charged, a thermionic tube having anode-cathode and control electrodes, the anode-cathode path of said thermionic tube being connected substantially in parallel with at least a portion of the output circuit of said rectifier, means for maintaining the thermionic tube in a state normally impervious to current flow, and means for effectively impressing said control voltages onto a control electrode of said thermionic tube to render the tube conducting and to discharge at least a portion of the energy stored in the charged element at a time when said oscillator is in a quiescent state.

3. A charging circuit comprising a first thermionic tube having anode, cathode, and control electrodes, a source of control voltages, an oscillator coupled to said thermionic tube and having the operating state thereof governed in accordance with the conduction state of said thermionic tube, means for effectively impressing the control voltages onto the control electrode-cathode path of said thermionic tube to control the conduction state thereof and to so control the operating state of said oscillator, a rectifier, means coupling said rectifier to said oscillator whereby at least a portion of the output of said oscillator is rectified by said rectifier, an output circuit for said rectifier adapted to furnish charging potentials to an electrical element to be charged, a discharge path connected substantially in parallel with at least a portion of the output circuit of said rectifier and adapted to discharge the charge stored in the electrical element when the discharge path is conducting, a second thermionic tube, means for controlling the conduction state of said discharge tube in accordance with the conduction state of said second thermionic tube and means for effectively impressing the control voltages onto said second thermionic tube to render the discharge path alternately conducting and impervious to current flow.

4. Apparatus in accordance with claim 3 wherein the conduction state of said second thermionic tube is controlled by the conduction state of said first thermionic tube and wherein the control pulses are impressed onto a control electrode-cathode path of said first thermionic tube to control the conduction state thereof and the conduction state of the second thermionic tube.

5. Apparatus in accordance with claim 4 wherein there is provided in addition, a differentiating network connected in a control electrode-cathode path of said first thermionic tube and wherein the control waves are impressed onto the differentiating network to form a wave having alternate positive and negative components.

6. An electrical charging circuit comprising: a source of control waves, an oscillator, means for shaping said control waves to form a series of positively and negatively extending control pulses, means for keying said oscillator into an active and quiescent state under the control of one polarity of control pulses, an output circuit for said oscillator, load terminals, a rectifier connected between said output circuit and said load terminals for supplying said load circuit with charging potentials and current from said oscillator, a normally blocked discharge path connected substantially in parallel with said load terminals, and means for governing the conducting state of said discharge path under the control of the other polarity of control pulses.

7. A charging circuit for charging an electrical element comprising: an oscillator, a source of control signals, means for shaping said control signals to form a series of positively and negatively extending control pulses, means for normally maintaining said oscillator in a selected state of operation, means for changing the operating state of said oscillator under the control of one polarity of control pulses, rectifying means coupled to said oscillator for rectifying at least a portion of the output thereof, an output circuit for said rectifier adapted to supply charging voltages to an element to be charged, a thermionic tube having anode-cathode and control electrodes, the anode-cathode path of said thermionic tube being connected substantially in parallel with at least a portion of the output circuit of said rectifier, means for maintaining the thermionic tube in a state normally impervious to current flow, and means for impressing the other polarity of control pulses onto a control electrode of said thermionic tube to render the tube conducting and to therby discharge at least a portion of the energy stored in the charged element at a time when said oscillator is in a quiescent state.

8. A charging circuit comprising a source of periodically recurrent control pulses, an oscillator, means for intermittently keying said oscillator under the control of said control pulses whereby said oscillator is alternately in an active and quiescent state, rectifying means coupled to said oscillator, an output circuit coupled to said rectifying means for supplying a charge to an element to be charged, and a controllable electron discharge path connected substantially in parallel with the output circuit of said rectifier.

9. A charging circuit comprising a source of control pulses having a differentiating network, means for impressing said control pulses onto said differentiating network to differentiate the pulses and to form a wave having leading and trailing pulses of opposing polarity, an oscillator, means for keying the oscillator on and off under the control of the differentiated control waves, rectifying means coupled to said oscillator and energized thereby, an output circuit connected to said rectifier for furnishing potentials intermittently to an element adapted to have energy stored therein, an electron discharge tube connected substantially in parallel with the output circuit of said rectifier, said discharge tube having a control element, biasing means for maintaining said discharge tube in a normally non-conducting state, and means for impressing a series of periodically recurrent signals to said discharge tube control electrode for periodically discharging the element adapted to have energy stored therein.

GEORGE C. SZIKLAI.
WILLIAM A. TOLSON.

REFERENCES CITED

The following references are of record in the file of this patent:

UNITED STATES PATENTS

| Number | Name | Date |
|---|---|---|
| 2,373,145 | Sensiper | Apr. 10, 1945 |
| 2,412,710 | Bradley | Dec. 17, 1946 |
| 2,419,340 | Easton | Apr. 22, 1947 |
| 2,464,259 | Proskauer | Mar. 15, 1949 |